(12) United States Patent
Ikeda et al.

(10) Patent No.: US 8,574,003 B2
(45) Date of Patent: Nov. 5, 2013

(54) BUSBAR

(75) Inventors: Tomohiro Ikeda, Makinohara (JP); Shinichi Yanagihara, Makinohara (JP); Hideki Inoue, Makinohara (JP)

(73) Assignee: Yazaki Corporation, Tokyo (JP)

( * ) Notice: Subject to any disclaimer, the term of this patent is extended or adjusted under 35 U.S.C. 154(b) by 7 days.

(21) Appl. No.: 13/391,151

(22) PCT Filed: Jul. 14, 2010

(86) PCT No.: PCT/JP2010/061881
§ 371 (c)(1),
(2), (4) Date: May 2, 2012

(87) PCT Pub. No.: WO2011/021452
PCT Pub. Date: Feb. 24, 2011

(65) Prior Publication Data
US 2012/0208410 A1      Aug. 16, 2012

(30) Foreign Application Priority Data
Aug. 18, 2009   (JP) ................................ 2009-188833

(51) Int. Cl.
*H01R 3/00*   (2006.01)
(52) U.S. Cl.
USPC ........................... 439/500; 439/627; 439/883
(58) Field of Classification Search
USPC ......... 439/212, 213, 500, 627, 874, 875, 883, 439/884
See application file for complete search history.

(56) References Cited

U.S. PATENT DOCUMENTS

| 6,146,788 A | 11/2000 | Ikeda et al. |
| 6,290,552 B1 | 9/2001 | Saito et al. |
| 7,229,320 B2 * | 6/2007 | Saito et al. ..................... 439/627 |
| 2001/0039150 A1 | 11/2001 | Saito et al. |
| 2001/0044241 A1 | 11/2001 | Saito et al. |
| 2001/0046816 A1 | 11/2001 | Saito et al. |
| 2006/0057457 A1 | 3/2006 | Bang |
| 2006/0183367 A1 | 8/2006 | Saito et al. |
| 2008/0199765 A1 | 8/2008 | Yoon et al. |

FOREIGN PATENT DOCUMENTS

| JP | 11-120988 A | 4/1999 |
| JP | 2000-333343 A | 11/2000 |
| JP | 2003-45409 A | 2/2003 |
| JP | 2003-242950 A | 8/2003 |
| JP | 2006-49275 A | 2/2006 |
| JP | 2006-222043 A | 8/2006 |
| JP | 2009-512982 A | 3/2009 |

OTHER PUBLICATIONS

International Search Report for PCT/JP2010/061881 dated Oct. 19, 2010.

* cited by examiner

*Primary Examiner* — Khiem Nguyen
(74) *Attorney, Agent, or Firm* — Sughrue Mion, PLLC

(57) ABSTRACT

A busbar includes a battery connecting portion and a wire connecting portion as a circuit body connecting portion. The battery connecting portion connects electrodes of two batteries to each other. The wire connecting portion is continued to the battery connecting portion, and connected directly with an electric wire so as to overlap a core wire of an electric wire thereon. The wire connecting portion includes a welding portion which the core wire of the electric wire is welded to, and a bridge portion connecting the welding portion and the battery connecting portion. A cross-sectional area of the bridge portion along an intersecting direction intersecting a direction of connecting the welding portion and the battery connecting portion is formed to be smaller than a cross-sectional area of the welding portion along the intersecting direction.

2 Claims, 12 Drawing Sheets

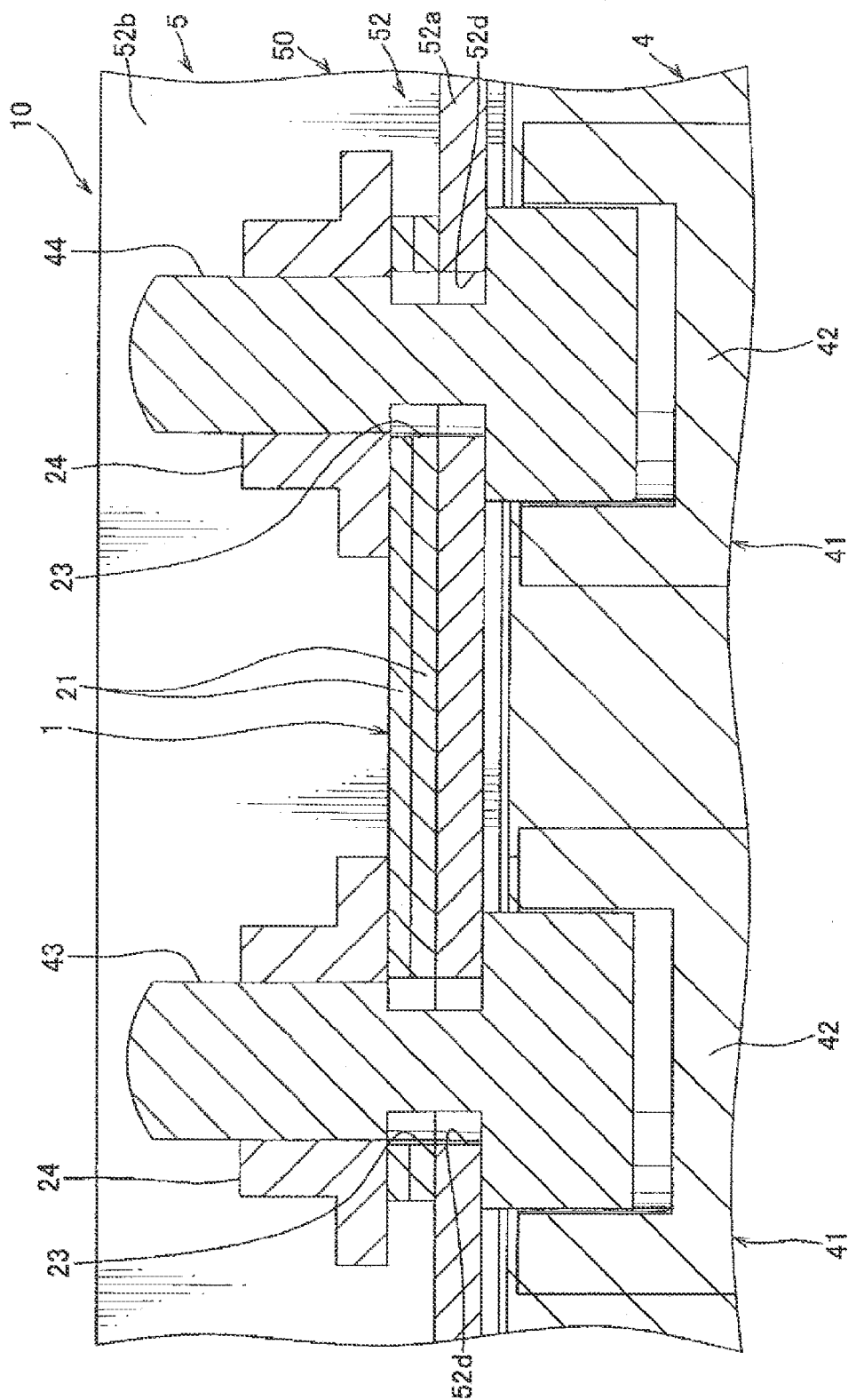

BUSBAR

CROSS REFERENCE TO RELATED APPLICATIONS

This application is a National Stage of International Application No. PCT/JP2010/061881 filed Jul. 14, 2010, claiming priority based on Japanese Patent Application No. 2009-188833 filed Aug. 18, 2009, the contents of all of which are incorporated herein by reference in their entirety.

TECHNICAL FIELD

This invention relates to a busbar applied to an electric power supply including a plurality of batteries and connecting electrodes of two batteries to each other.

BACKGROUND ART

An electric car driven by an electric motor and a hybrid car driven by both an electric motor and an engine require an electric power supplying high-voltage electric power to the electric motor for smooth driving. An electric power supply structured by connecting a plurality of relatively small batteries in series (see Patent Document 1) is mounted in the electric car and the hybrid car.

FIG. 13 is a plan view of an electric power supply by prior art. The electric power supply includes a battery assembly (not shown) and a busbar module 105 overlapped on the battery assembly. The battery assembly includes a plurality of batteries. The plurality of batteries is held to be arranged along one direction so as to array a positive electrode of one battery and a negative electrode of another battery adjacent to the one battery corresponding to each other.

The busbar module 105 includes a plate 150 and a plurality of busbars 101. The plate 150 is formed by insulation synthetic resin to have a top shape same as that of the battery assembly as a whole. The top plate 150 includes a plurality of busbar receiving sections 152 receiving the busbar 101. Each of the busbar receiving sections 152 includes a bottom wall 152a, on which the busbar 101 is overlapped, having a hole communicating with a later-described hole 123 of the busbar 101 and a plurality of side walls 152b extending vertically from outer edges of the bottom wall 152a, and the busbar receiving section 152 is formed into a box shape having an opening at a top thereof.

The busbar 101 is formed into a rectangular shape by pressing an electric conductive metal sheet. The busbar 101 includes a pair of holes 123 passing a positive electrode and a negative electrode adjacent to each other of adjacent batteries.

When the electric power supply mentioned above is assembled, the busbar 101 is mounted at the busbar receiving section 152 of the plate 150 so as to communicate the hole 123 of the busbar 101 and the hole of the busbar receiving section 152. The electrode of the battery is inserted through the holes communicated with each other, and the busbar module 105 is overlapped on the battery assembly, and a nut is screwed to the electrode. Thereby, each busbar connects the electrodes adjacent to each other of the batteries adjacent to each other, so that the plurality of busbars 101, that is the busbar module 105, connects the plurality of batteries in series. Thus, the electric power supply is assembled.

For exerting maximum performance of the electric power supply, it is required to monitor remaining capacity (voltage value) of each battery. For this purpose, the batteries of the electric power supply mentioned above maybe connected through electric wires 106 as a circuit body with an ECU (electronic control unit) as a control device.

The electric wire 106 is a covered electric wire having an electric conductive core wire 161 and an insulation cover 162 covering the core wire 161. The cover 162 at one end of the electric wire 106 is peeled and removed so as to expose the core wire 161. The one end of the electric wire 106 is connected with a voltage detecting terminal 109.

The voltage detecting terminal 109 is formed by pressing a conductive metal sheet, and includes integratedly a battery connecting portion 191 connected with the electrode of the battery (busbar 101) and a wire connecting portion 192 connected with the electric wire 106. The battery connecting portion 191 is formed into a square shape having about a half size of the busbar 101, and includes a hole 193 passing the negative electrode or the positive electrode of the battery at a central area of the battery connecting portion 191. The wire connecting portion 192 includes a bottom plate portion having a rectangular plate shape and continuing an outer edge of the battery connecting portion 191, and a plurality of clamp pieces continued to both side ends along a widthwise direction of the bottom plate portion.

The exposed core wire 161 of the one end of the electric wire 106 is overlapped on the bottom plate portion of the wire connecting portion 192, and connected with the voltage detecting terminal 109 by clamping the clamp pieces. The electrode of the battery is passed through the hole 193 and the battery connecting portion 191 is overlapped on the busbar 101 in the busbar receiving section 152, and the nut is screwed to the electrode, and thus, the voltage detecting terminal 109 is connected with the electrode of the battery (busbar 101). The other end of the electric wire 106 is connected with a connector so as to be connected to the ECU through the connector. Thus, the battery of the electric power supply and the ECU are connected through the electric wire 106 and the voltage detecting terminal 109 (and the busbar 101), and the remaining capacity of each battery is monitored.

CITATION LIST

Patent Document
Patent Document 1: Japan Patent Application Published No. 2003-45409

SUMMARY OF INVENTION

Objects to Be Solved

According to the electric power supply, the one end of the electric wire 106 connected with the ECU is connected to the voltage detecting terminal 109, and thereafter, by overlapping the voltage detecting terminal 109 on the busbar 101, the electric wire 106 is connected with the battery. The busbar 101 and the voltage detecting terminal 109 are separated component to each other, so that there is a problem that number of components becomes large. Furthermore, it is required that both of the busbar 101 and the voltage detecting terminal 109 is mounted at the busbar receiving section 152, so that process of assembling becomes troublesome and the process of assembling requires much time.

According to the above problems, an object of the present invention is to provide a busbar, which can reduce number of components and improve working property of assembling.

How To Attain The Object Of The Present Invention

In order to overcome the above problems and attain the object, the present invention claimed in claim 1 is to provide a busbar, which includes a battery connecting portion connecting electrodes of two batteries to each other, and further includes a circuit body connecting portion continued to the battery connecting portion and connected directly to a circuit body by overlapping a conductive core wire of the circuit body on the circuit body connecting portion.

The busbar claimed in claim 2 is further characterized in that the circuit body connecting portion includes a welding portion, at which the conductive core wire of the circuit body is welded, and a bridge portion connecting the welding portion and the battery connecting portion, and a cross-section area of the bridge portion along an intersecting direction intersecting a direction of connecting the welding portion and the battery connecting portion is configured to be smaller than a cross-section area of the welding portion along the intersecting direction.

The busbar claimed in claim 3 is further characterized in that the welding portion includes a projection which projects from a surface of the welding portion and the conductive core wire of the circuit body is overlapped on and welded.

The busbar claimed in claim 4 is further characterized in the busbar claimed in one of claims 1-3 in that the battery connecting portion includes a plurality of plate portions overlapped to each other and having a hole passing the electrode of the battery, and a second bridge portion joining the plate portions to each other.

Effects of the Invention

According to the present invention claimed in claim 1, the circuit body is connected directly to the busbar, so that an additional component connected with the circuit body and joining to the busbar is not required. Therefore, number of components can be reduced. The terminal is not required, so that number of steps of processes can be educed and time of assembling can be shortened and working property of assembling can be improved.

According to the present invention claimed in claim 2, the cross-sectional area of the bridge portion is configured to be smaller than the cross-section area of the welding portion, so that when welding the busbar and the circuit body, heat generated at the welding portion is not easily flowed through the bridge portion to the battery connecting portion. Thereby, the conductive core wire can be welded with the welding portion efficiently, so that the busbar and the circuit body can be welded securely.

According to the present invention claimed in claim 3, by overlapping the conductive core wire on the projection projecting from the surface of the welding portion and welding them, an area of a contact point of the welding portion and the conductive core wire can be reduced. Thereby, when the busbar and the circuit body are welded, construction resistance is formed at the contact point so that heat by resistance can be easily generated and the generated heat is not easily flowed to the bridge portion. Therefore, the welding portion and the conductive core wire can be melted efficiently and the busbar and the circuit body can be securely welded to each other.

According to the present invention claimed in claim 4, the plurality of plate portions overlapped to each other can be easily bent more than one plate portion having a thickness equal to total of each thickness of the plurality of plate portions. Thereby, when the batteries have dispersion about a height of the electrodes thereof, the plurality of plate portions can be bent so as to absorb the dispersion. Therefore, the busbar and the electrode of the battery can be securely connected. The busbar can be formed by pressing thinner metal sheet, so that the busbar can be manufactured with good yield and manufacturing cost can be reduced.

BRIEF DESCRIPTION OF DRAWINGS

FIG. 10 is a cross-sectional view showing that electrodes of batteries are connected by the busbar shown in FIG. 1;

DESCRIPTION OF EMBODIMENTS

A busbar of one embodiment according to the present invention will be described with reference to drawings FIGS. 1-12. The busbar 1 of the one embodiment according to the present invention shown in FIG. 1 structures an electric power supply 10 shown in FIG. 2. The electric power supply 10 is mounted at an electric car driven by an electric motor and a hybrid car driven by both an electric motor and an engine, and supplies electric power to the electric motor.

Figure 2:
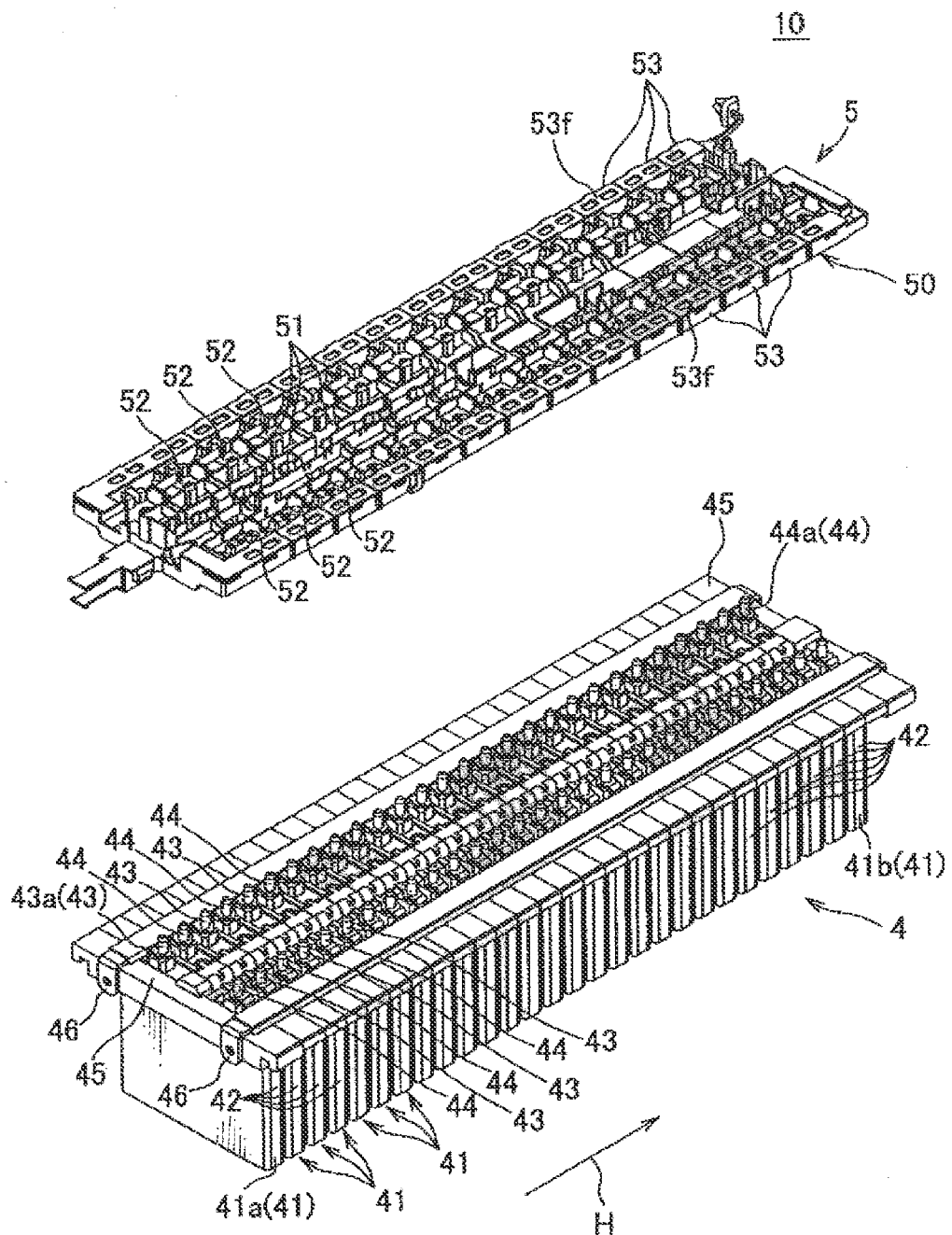
FIG. 2 is an exploded perspective view of an electric power supply in which the busbar shown in FIG. 1 is applied.

The electric power supply 10 includes a battery assembly 42 and a busbar module 5 as shown in FIG. 2. The battery assembly 4 includes a plurality of batteries 41, an end plate 45 and a fixing band 46.

The battery 41 includes a battery main body 42, a positive electrode 43 and a negative electrode 44. The battery main body 42 is formed into a flat box shape. The positive electrode 43 and the negative electrode 44 are formed into a rod shape projecting upwardly from a top surface located at a top side in FIG. 2 of the battery main body 42. The positive electrode 43 and the negative electrode 44 are arranged in parallel to each other. Hereafter, the positive electrode 43 and the negative electrode 44 may be called electrodes 43, 44. The positive electrodes 43 and the negative electrode 44 correspond to electrodes described in claims.

The plurality of batteries 41 is arranged along one direction H shown by an arrow H so as to align the top surface of each of battery main bodies 42 within the same plane and make the positive electrode 43 of one of batteries adjacent to each other to be adjacent to the negative electrode 44 of another of the batteries adjacent to each other. In other words, the plurality of batteries is overlapped by opposing one by one so as to alternate the positive electrode 43 and the negative electrode 44 along the one direction H.

A pair of end plates 45 is arranged and formed by insulation synthetic resin. The pair of end plates 45 is overlapped on the batteries 41 at the both ends of the plurality of batteries 41 arranged along the one direction H so as to clamp the plurality of batteries 41 between them. The pair of endplates 45 and the plurality of batteries 41 are arranged along the one direction H.

A pair of fixing bands 46 is arranged and formed into band shape. The pair of fixing bands 46 is arranged along the one direction H so as to be at an interval in parallel to each other. The fixing band 46 are overlapped on the top surface of the battery main bodies 42 of the plurality of batteries 41 arranged along the one direction H and top surfaces of the end plates 45, and each of both ends of the fixing band 46, which a bolt hole passes through, is overlapped on a side surface of each of the end plates 45. The both ends of the fixing bands 46 are fixed to the end plates 45 by not-shown bolts so as to hold the plurality of batteries 41 and the end plates 45 integratedly.

The busbar module 5 is mounted at the battery assembly 4 so as to connect the plurality of batteries in series. The busbar module 5 includes a plate 50 and a plurality of busbars 1 (FIG. 1) to be mounted at the plate 50.

Figure 7:
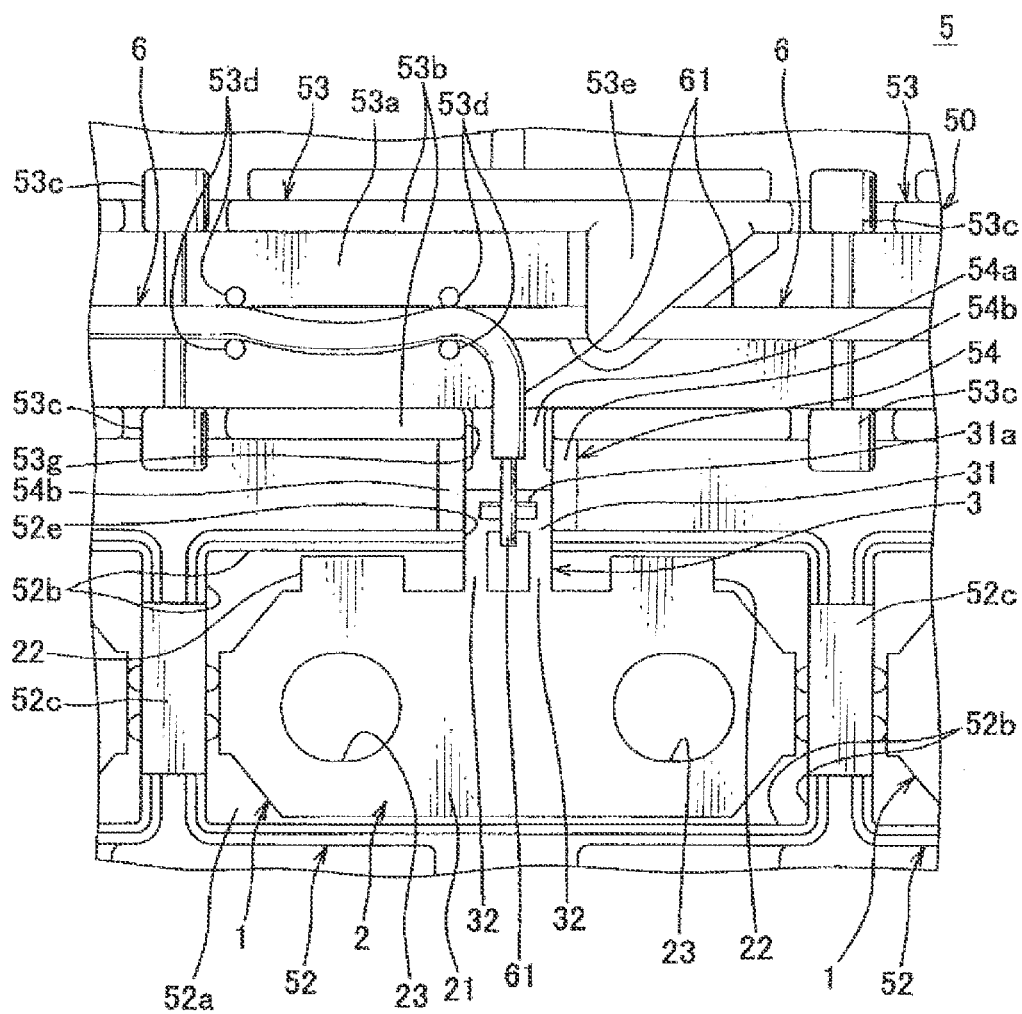
FIG. 7 is a plan view showing that the busbar shown in FIG. 1 is mounted at a busbar receiving section.

The plate 50 is formed by insulation synthetic resin. As shown in FIG. 2, the plate 50 is formed into a rectangular shape same as a top shape of the battery assembly in top view as a whole. As shown in FIG. 2, the plate 50 includes integratedly a thermister receiving section 51, a busbar receiving section 52, a wire guide section 53 and a welding portion receiving section (FIG. 7).

A plurality of thermister receiving section 51 is provided. Each of the thermister receiving sections 51 includes a bottom wall having a hole which a thermister thermometer is inserted through and a plurality of side walls extending vertically from outer edges of the bottom wall, and is formed into a box shape having an opening at a top thereof. The side walls are provided with a projection which is engaged with the thermister thermometer so as to push the thermister thermometer toward the top surface of the battery main body 42 to be contacted constantly. The plurality of thermister receiving sections 51 is provided at a center along the widthwise direction so as to be located along a lengthwise direction of the plate 50. The thermister receiving sections 51 are arranged in the full length of the plate 50 along the lengthwise direction of the plate 50.

The thermister receiving section 51 receives the thermister thermometer and an electric wire which one end is connected with the thermister thermometer inside the thermister receiving section 51. The other end of the electric wire is joined with a connector and connected with an ECU (Electronic Control Unit: not shown) as a control device by the connector. The ECU is connected with a cooling device cooling the battery assembly 4. The ECU controls the cooling device according to a temperature data of the battery 41 from the thermister thermometer so as to maintain the battery assembly 4 in a suitable temperature.

A plurality of busbar receiving sections 52 is provided. Each of the busbar receiving sections 52 includes a bottom wall 52*a*, which the busbar 1 is overlapped on, and a plurality of side walls 52*b* extending vertically from outer edges of the bottom wall 52*a*, and is formed into a box shape having an opening at a top thereof as shown in FIG. 7. The busbar receiving section 52 receives the busbar 1 inside it. The plurality of busbar receiving sections 52 is arranged along the lengthwise direction of the plate 50 (right-left direction in FIG. 7) in the full length of the plate 50. The busbar receiving sections 52 adjacent to each other are arranged at an interval to each other and the side walls 52*b* opposed to each other are joined by a hinge 52*c*. The plurality of busbar receiving sections 52 is arranged to make two rows at an interval along a widthwise direction of the plate 50. The two rows of the busbar receiving sections 52 are located so as to position the thermister receiving sections 51 therebetween.

The bottom wall 52*a* of each of the busbar receiving sections 52 includes a pair of holes 52*d* (FIG. 10) communicating with later-described holes 23 of the busbar 1 and passing through the bottom wall 52*a*. Through the hole 52*d* and the hole 23 of the busbar, 1 communicating to each other, the positive electrode 43 and the negative electrode 44 adjacent to each other are inserted. A busbar passing portion 52*e*, which a later-described wire connecting portion 3 of the busbar 1 is passed through, is formed at the side wall 52*b* of the busbar receiving section 52 located further from the thermister receiving section 51 (upper side in FIG. 7). The busbar passing portion 52*e* is provided at a center along the lengthwise direction of the side wall 52*b* by cutting out the side wall 52*b* from an edge of the side wall 52 further from the bottom wall 52*b* toward the bottom wall 52*b*.

A plurality of wire guide sections 53 is provided. Each of the wire guide sections 53 includes a rectangular-shaped bottom wall 53*a*, which the electric wire 6 (later described) welded to each busbar 1 is overlapped on, and a pair of side walls 53*b* extending vertically from both edges along the widthwise direction of the bottom wall 53*a*, and is formed into a gutter shape having a upward opening as shown in FIG. 7. The plurality of wire guide sections 53 is arranged along the lengthwise direction of the plate 50 in the full length of the plate 50. The wire guide sections 53 adjacent to each other are arranged at an interval to each other and the side walls 53*b* adjacent to each other are joined by a hinge 53*c*. The plurality of wire guide sections 53 is arranged to make two rows at both ends along the widthwise direction of the plate 50 at an interval. The two rows of the wire guide sections 53 are located so as to position the row of the busbar receiving sections 52 therebetween. Each of the wire guide sections 53 opposes to each of the busbar receiving sections 52. The plurality of electric wire 6 is arranged in the wire guide section 53.

Each of wire guide sections 53 includes a wire holding piece 53*d*, a top wall 53*e*, a cover 53*f*, and a wire passing hole 53*g*. Pairs of wire holding pieces 53*d* are arranged so as to be formed into a round pin shape by projecting from the bottom wall 53*a*. The pair of wire holding pieces 53*d* positions the electric wire 6 therebetween so as to hold the electric wire 6 guided in the wire guide section 53. The top wall 53*e* extends from an end of the side wall 53*b* further from the bottom wall 53*a* so as to oppose to the bottom wall 53*a*. The top wall 53*e* prevents the electric wire 6 from falling out of the wire guide section 53.

The cover 53*f* is continued through a hinge to the side wall 53*b* so as to cover the opening of the wire guide section 53. The wire passing hole 53*g* is arranged at the side wall 53*b* of the busbar receiving section 52 so as to correspond to the busbar passing portion 52*e*. The wire passing hole 53*g* is formed by cutting out the side wall 53*b* from an edge of the side wall 53*b* further from the bottom wall 53*a* toward the bottom wall 53*a*. The electric wire 6 in the wire guide section 53 is led through the wire passing hole 53*g* into the welding portion receiving section 54.

The welding portion receiving section 54 is arranged between the busbar receiving section 52 and the wire guide section 53 so as to communicate the busbar receiving section 52 and the wire guiding section 53, as shown in FIG. 7. The welding portion receiving section 54 includes a rectangular shape bottom wall 54a, which one edge is continued to the bottom wall 52a of the busbar receiving section 52 and the other edge is continued to the bottom wall 53a of the wire guide section 53, and a pair of side walls 54b extending vertically from both edges along the widthwise direction of the bottom wall 54a, and is formed into a gutter shape. The bottom wall 52a includes a hole which an electrode of a later-described resistance welding machine passes through. One edge of the side wall 54b is continued to an edge of the busbar passing hole 52e of the busbar receiving section 52, and the other edge of the side wall 54b is continued to an edge of the wire passing hole 52e. An inner space of the welding portion receiving section 54 communicates with both of an inner space of the busbar receiving section 52 and an inner space of the wire guide section 53. The later-described welding portion 31 of the busbar 1 and one end of the electric wire 6 is positioned in the welding portion receiving section 54 so as to locate a weld point of the busbar 1 and the electric wire 6.

The electric wire 6 (corresponds to a circuit body in claim) is connected directly to the busbar 1. The electric wire 6 is a covered wire including an electrically conductive core sire 61 and an insulation cover 62 covering the core wire 61. The electric wire 6 is formed with a round cross-section.

The core wire 61 is formed by stranding a plurality of element wires (not shown). The element wire is made of electric conductive metal material, especially in the embodiment, oxygen free copper (JIS: Japan Industry Standard H3100-C1020) is applied. The core wire 61 may be formed by single element wire. The cover 62 is made of insulation synthetic resin. The cover 62 at one end of the electric wire 6 is peeled and removed so as to expose the core sire 61.

Figure 6:
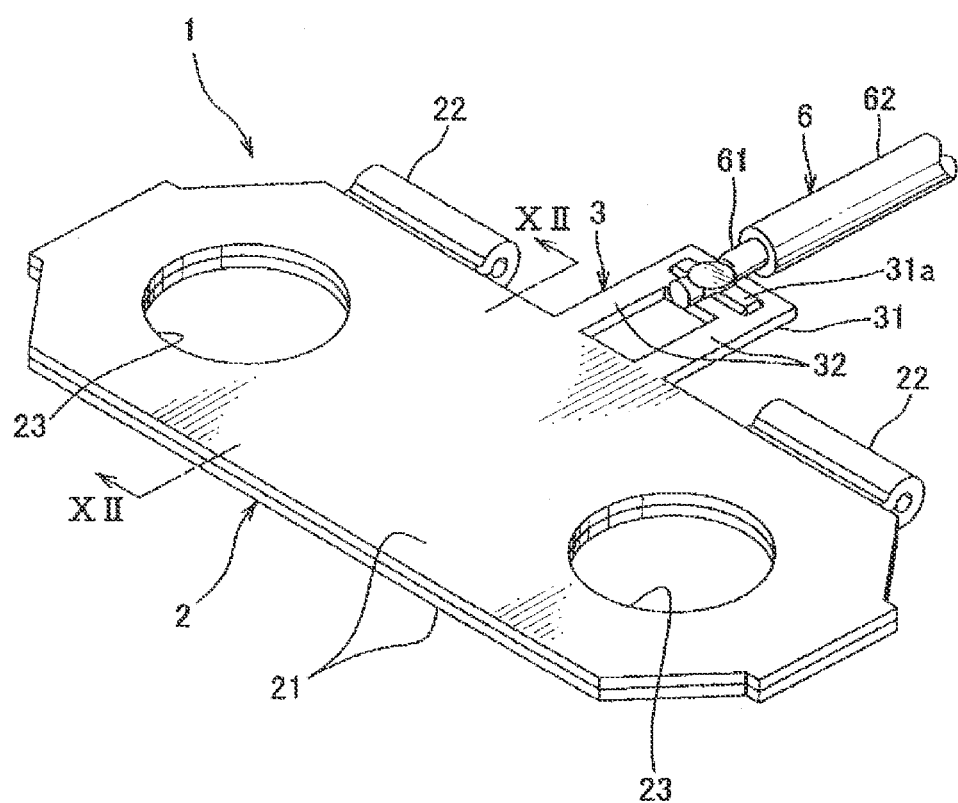
FIG. 6 is a perspective view showing that the conductive core wire of the electric wire is welded on the busbar shown in FIG. 1.

An exposed core sire 61 at the one end of the electric wire 6 is welded on the busbar 1 as shown in FIG. 6. The other end of the electric wire 6 is joined to a connector so as to be connected with the ECU by the connector. The ECU is connected through the electric wire 6 and the busbar 1 with the electrodes 43, 44 of each of the batteries 41. The ECU monitors a remaining capacity of each battery 41 by detecting an electric potential difference (voltage) between the electrodes 43, 44 of each of the batteries 41.

Figure 1:
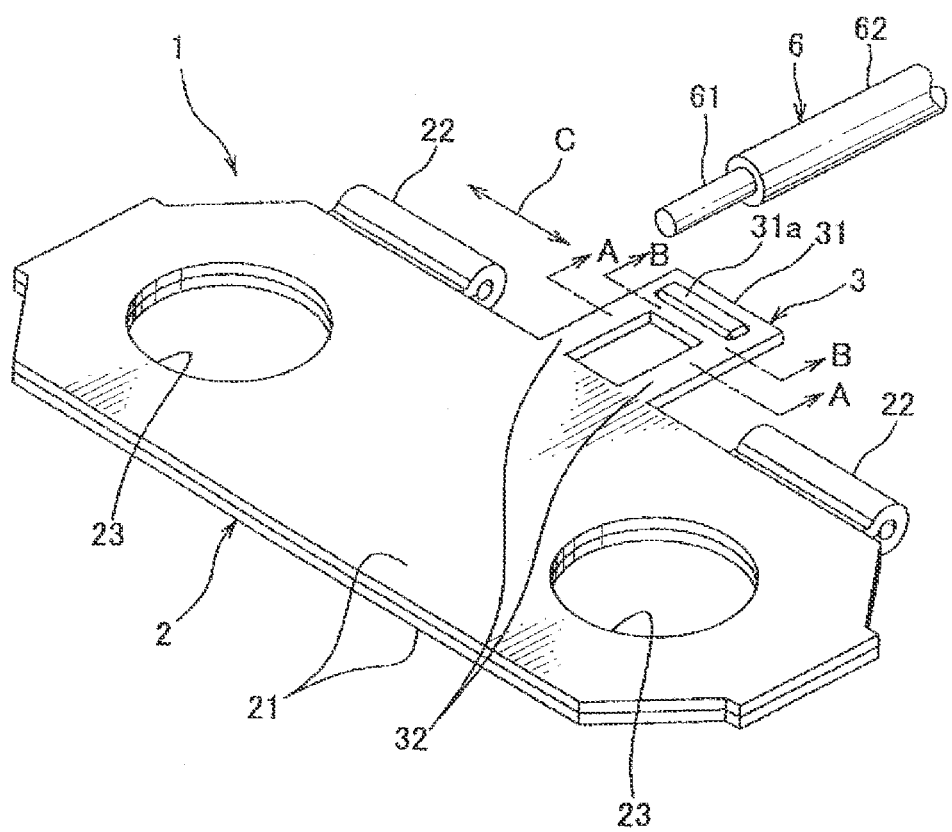
FIG. 1 is a perspective view of a busbar of one embodiment according to the present invention.
Figure 3:
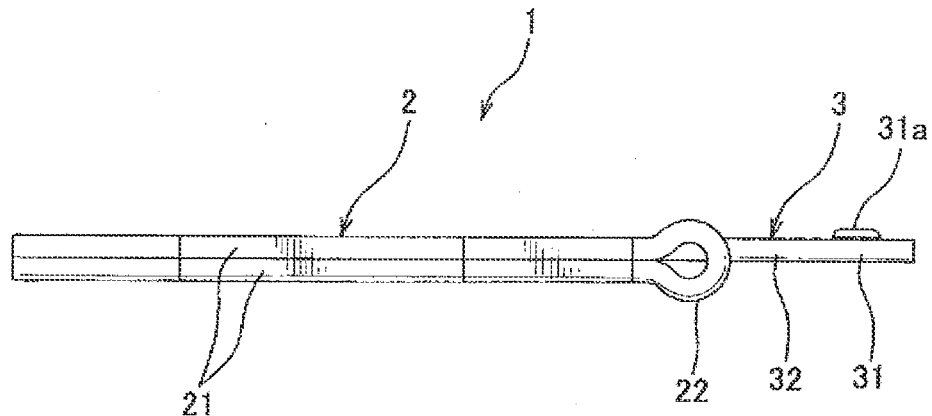
FIG. 3 is a side view of the busbar shown in FIG. 1.
Figure 4:
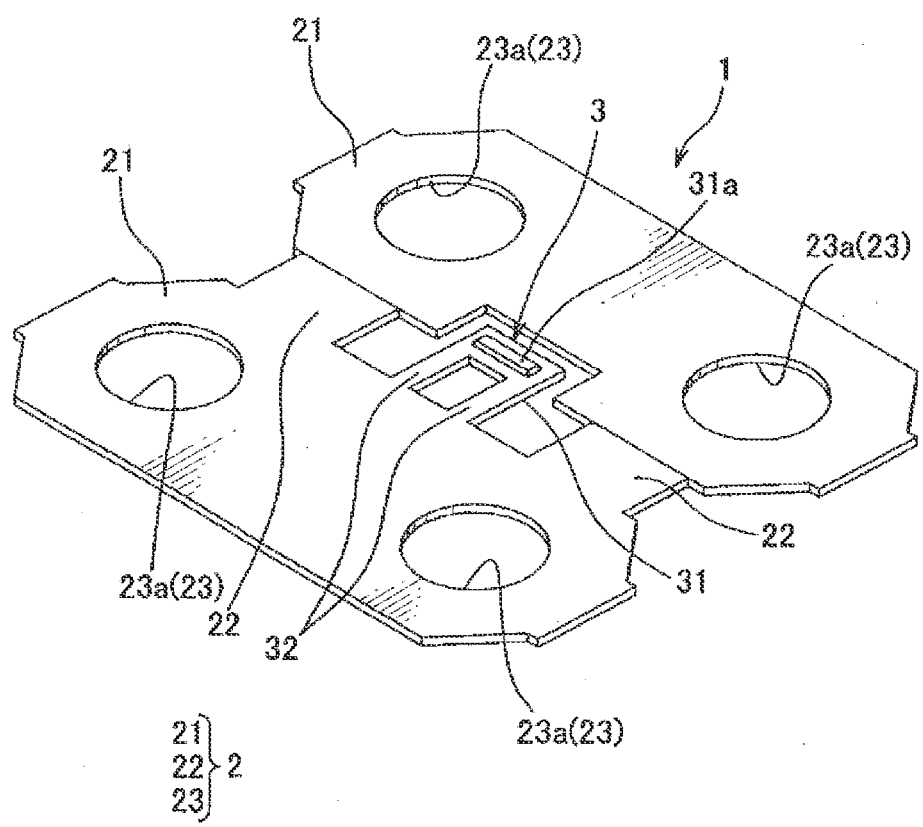
FIG. 4 is a developed view of the busbar shown in FIG. 1.

The busbar 1 is formed by electric conductive metal, especially in the embodiment, oxygen free copper (JIS: Japan Industry Standard H3100-C1020) is applied. The busbar 1 is formed by pressing metal sheet of the oxygen free copper. As shown in FIGS. 1, 3 and 4, the busbar 1 includes integratedly a battery connecting portion 2 and a wire connecting portion 3 as a circuit body connecting portion.

The battery connecting portion 2 includes a pair (plurality) of plate portions 21, and a second bridge portion 22 connecting the pair of plate portions 21 to each other. The pair of plate portions 21 is formed into a rectangular mostly same shape to each other which four corners are cut out. The pair of plate portions 21 is overlapped to each other. Three or more plate portions 21 may be overlapped.

The pair of plate portions 21 includes a pair of holes 23 passing the electrode 43, 44 of the battery 41. Each of the pair of holes 23 is formed into a round shape in plan view through the pair of plate portions 21. By overlapping the pair of plate portions 21, each hole 23a passing through each plate portion 21 is communicated to each other, so that each hole 23 is formed by the each hole 23a. The pair of holes 23 is arranged at an interval in the center of the plate portion 21 along the lengthwise direction of the plate portion 21.

A pair of second bridge portions 22 is formed by bending a plate into cross-section of C-shape. One end of C-shape of each of the second bridge portions 22 is continued to one end along the widthwise direction of one plate portion 21 and the other end of the C-shape is continued to one end along the widthwise direction of the other plate portion 21 so as to join the ones of the pair of plate portions 21. The pair of second bridge portions 22 is arranged at an interval along the lengthwise direction of the plate portion 21.

By inserting the positive electrode 43 of the one battery 41 and the negative electrode, which is adjacent to the positive electrode, of the other battery 41 adjacent to the one battery 41 into each of the pair of holes 23 of the plate portion 21, the battery connecting portion 2 structured as above connects the positive electrode 43 and the negative electrode 44 to each other. The plurality of busbars 1 connects each of the positive electrodes 43 and the negative electrode 44 adjacent to the each of the positive electrodes 43, excluding the positive electrode 43 (marked by 43a) of the battery 41 (marked by 41a in FIG. 2) located at one end of the plurality of batteries 41 arranged along the one direction H and the negative electrode 44 (marked by 44a) of the battery 41 (marked by 41b) located at the other end of the plurality of batteries 41, so as to connect the plurality of batteries 41 of the battery assembly 4 in series.

As shown in FIG. 1, the wire connecting portion 3 is continued to the battery connecting portion 2, and extends from the central area of one side of the one plate portion 21, to which the second bridge portion 22 is continued. The wire connecting portion 3 is formed by single sheet having a thickness same as the one plate portion 21. The wire connecting portion 3 includes integratedly the welding portion 31 and a bridge portion 32.

The welding portion 31 is formed into a rectangular shape so as to align a lengthwise direction thereof in parallel to the lengthwise direction of the plate portion 21. A projection 31a, which the conductive core wire 61 of the electric wire 6 is overlapped and welded, projects from one surface of the welding portion 31. The projection 31a is formed into a rectangular shape in plan view.

A pair of bridge portions 32 formed into a plate shape is provided. The pair of bridge portions 32 is arranged at an interval to each other in parallel to each other. Each of the bridge portions 32 is arranged along a direction perpendicular to the lengthwise direction of the plate portion 21. One end along the lengthwise direction of each of the bridges 32 is continued to the welding portion 31, and the other end of each of the bridges 32 is continued to the one plate portion 21, that is the battery connecting portion 2, so as to connect the welding portion 31 and the battery connecting portion 2. One of the bridge portions 32 is continued to the one end along the lengthwise direction of the welding portion 31 and the other of the bridge portions 32 is continued to the other end along the lengthwise direction of the welding portion 31.

Figure 9A:
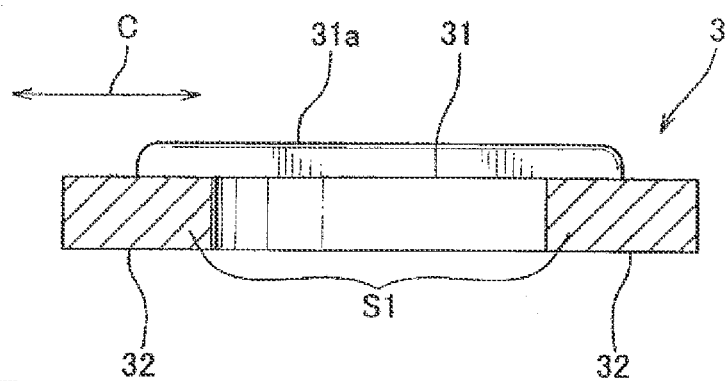
FIG. 9A is a cross-sectional view taken along the line A-A shown in FIG. 1.
Figure 9B:
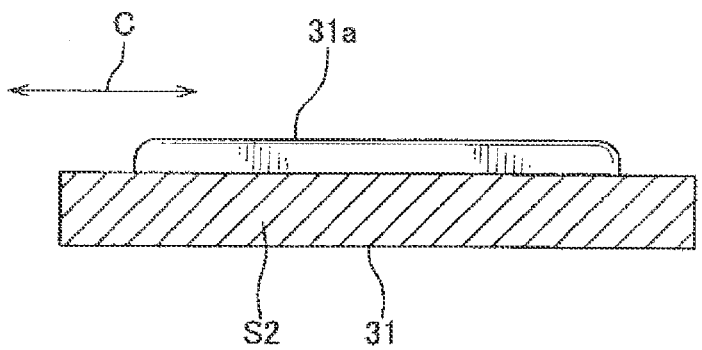
FIG. 9B is a cross-sectional view taken along the line B-B shown in FIG. 1.
Figure 11:
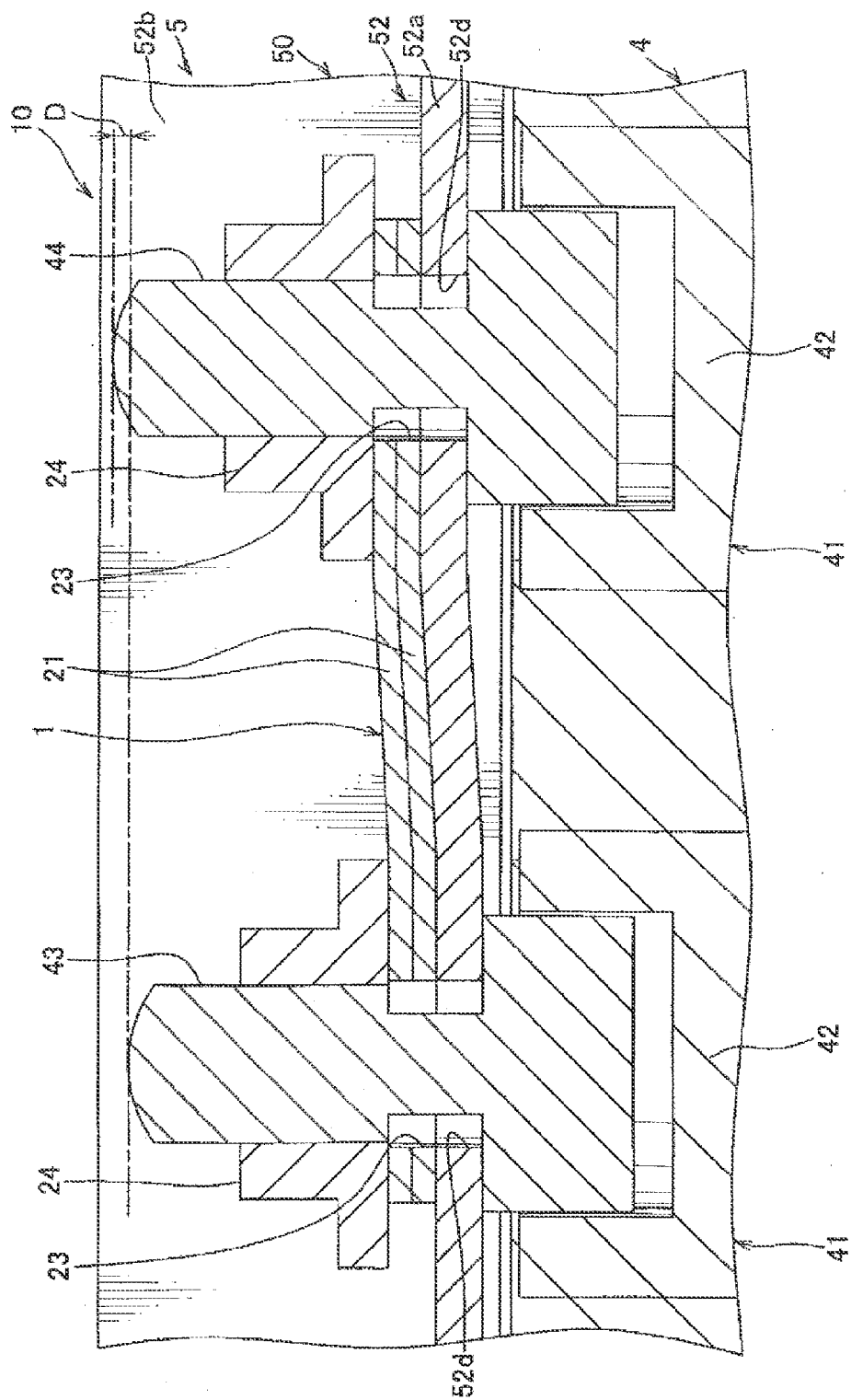
FIG. 11 is a cross-sectional view showing that electrodes of batteries have a dispersion of height in FIG. 10.

As mentioned above, the pair of bridge portions 32 is arranged at an interval to each other. Thereby, as shown in FIG. 9, a cross-sectional area S1 of the pair of bridge portions 32 along a direction C (shown in with an arrow C in FIGS. 1 and 9) perpendicular to the lengthwise direction of the bridge portion 32 is smaller than a cross-sectional area S2 of the welding portion 31 along the direction C.

Figure 5:
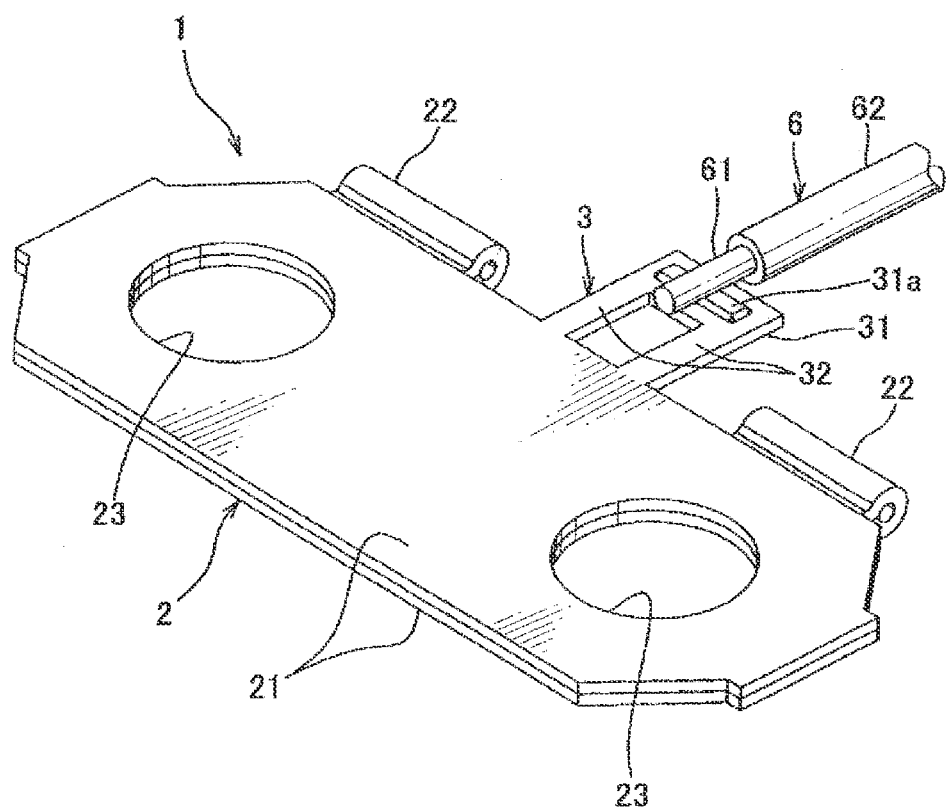
FIG. 5 is a perspective view showing that a conductive core wire of an electric wire is overlapped on the busbar shown in FIG. 1.

In the electric power supply 10 structured as mentioned above, when the electric wire 6 is directly connected to the busbar 1, firstly, the busbar 1 is mounted in the busbar receiving section 52 so as to position the wire connecting portion in the busbar receiving section 52, and position the welding portion 31 in the welding portion receiving section 54. After that, the electric wire 6 is led in the wire guide sections 53, and the exposed one end of the core wire 61 of the electric wire 6 is overlapped in the projection 31a of the welding portion 31 in the welding portion receiving section 54 (FIGS. 5, 7).

Figure 8:
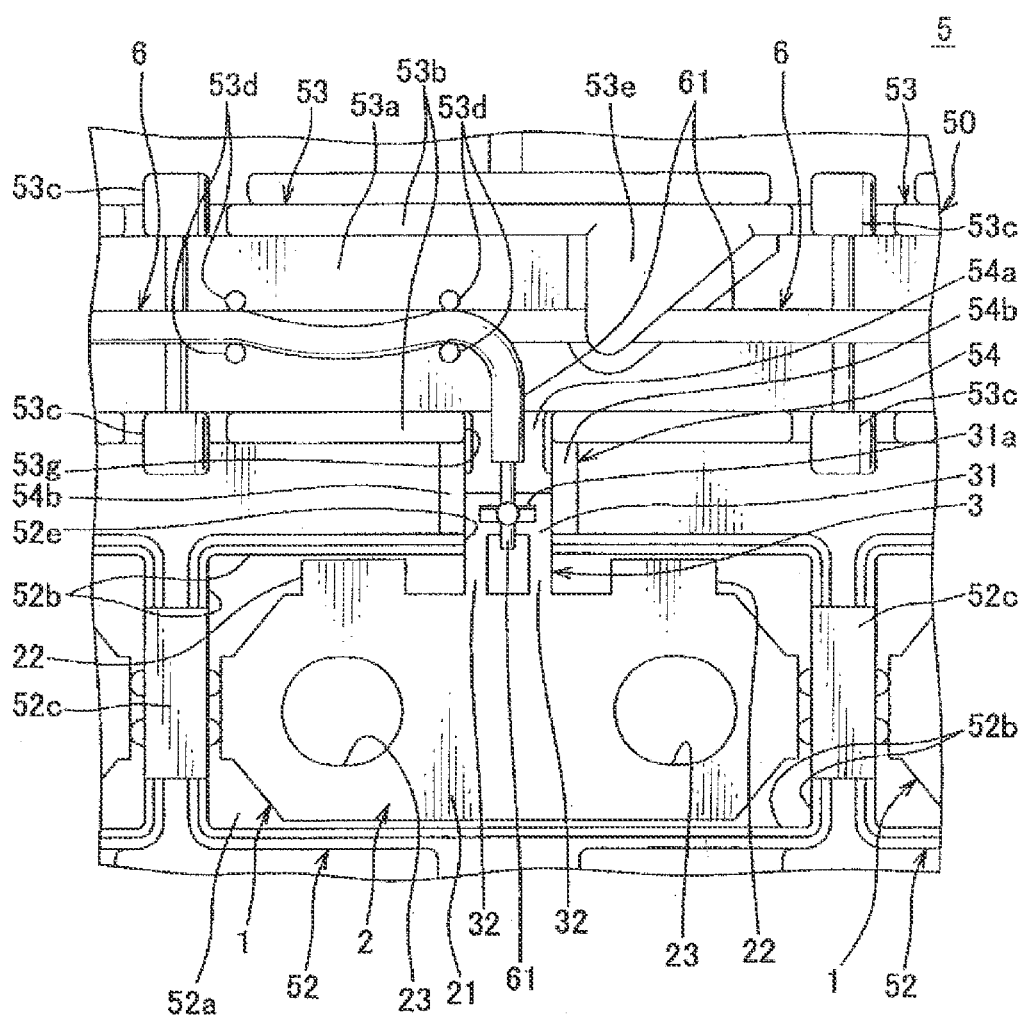
FIG. 8 is a plan view showing that the conductive core wire of the electric wire is welded on the busbar shown in FIG. 7.

Thereafter, by using a known resistance welding machine (not shown), the busbar 1 and the core wire 61 of the electric wire 6 is welded by resistance welding. The welding portion 31, which the core wire 61 is overlapped on the projection 31a, is positioned between a pair of electrodes of the resistance welding machine. Then, the welding portion 31 and the core wire 61 are clamped between the pair of electrodes, and pressed by the pair of electrodes approaching to each other, and welding current is flowed between the pair of electrodes. Thereby, heating by resistance is generated at a contact point of the projection 31a and the core wire 61, and the contact point is melted and joined, so that the projection 31a and the core wire 61 are welded by resistance welding (FIGS. 6, 8). Thus, the busbar 1 and the electric wire 6 are directly connected.

The busbar 1 is made of oxygen free copper, and its resistivity is low (conductivity is high) so that it is difficult to generate the heating by resistance and perform resistance welding. However, by overlapping the core wire 61 on the projection 31a, contact area of a contact point between the welding portion 31 and the core wire 61 is reduced and construction resistance is generated at the contact point, so that the heating by resistance is easily generated.

Furthermore, the busbar 1 (and the core wire 61) made of oxygen free copper has high heat conductivity, so that heating by resistance may be transmitted in order from the contact point to the welding portion 31 and the bridge portions 32 and easily diffused to the battery connecting portion 2. However, the cross-sectional area S1 of the bridge portions 32 is smaller than the cross-sectional area S2 of the welding portion 31, so that heating by resistance may not be easily transmitted through the bridge portions 32 to the battery connecting portions 2. Furthermore, the core wire 61 is overlapped on the projection 31a, so that the contact area of contact point between the welding portion 31 and the core wire 61 is reduced and the heating by resistance maybe not easily transmitted to the bridge portion 32.

Thus, after welding the busbar 1 and the core wire 6, the busbar module 5 is overlapped on the battery assembly 4 so as to pass the electrodes 43, 44 of the battery 41 through the hole 23 of the busbar 1 and the hole 52d of the busbar receiving section 52, which are communicated with each other. After that, as shown in FIG. 10, nuts 24 are screwed to the electrodes 43, 44, and the busbar module 5 is fixed on the battery assembly 4. Thus, the electric power supply 10 is assembled.

At the time, when there is dispersion D of the height (projecting length) of the electrodes 43, 44 from the top surface of the battery main body 42 (FIG. 11), the plate portion 21 of the busbar 1 is mounted so as to be tilted to the surface of the battery main body 42 and the nuts 24 are screwed to the electrodes 43, 44. Thereby, contact between the battery connecting portion 2 and the electrodes 43, 44 may become unstable and large stress may load on the electrodes 43, 44. The battery connecting portion 2 may be formed by overlapping the pair of plate portions 21, so that the battery connecting portion 2 can be easily bent more than that formed by single plate portion 21A having the same thickness, as mentioned as following. The pair of plate portions 21 is bent, so that the dispersion D of the heights of the electrodes 43, 44 can be absorbed.

The thickness of each of plate portions 21 is indicated with T, so the total thickness of the pair of plate portions 21 is defined by 2T. Bendability of the plate portion 21A by single plate with thickness 2T and the plate portion 21 by the pair of plate portions 21 with thickness T is compared. In general, an object having larger second moment of area may be bent less easily. The second moment of area I of the object with rectangular cross-section is indicated as follows when an axis is X (FIG. 12), a width of a cross-section is b and a height of the cross-section is h;

$$I = b*h^3/12 \qquad \text{(Formula 1)}$$

Figure 12A:
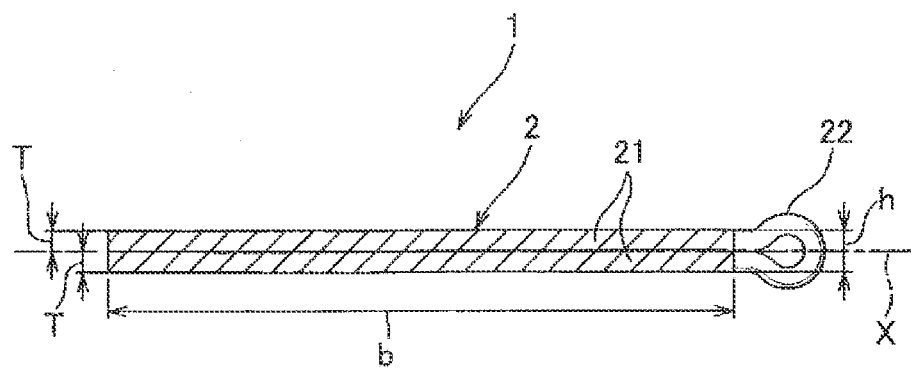
FIG. 12A is a cross-sectional view taken along the line XII-XII shown in FIG. 6.

By leading from Formula 1 and FIG. 12A, the second moment of area I2 of the object by two overlapped plate portions 21 is indicated by assigning thickness T to the height h;

$$I2 = 2*(b*T3/12) = 2b*T3/12$$

Figure 12B:
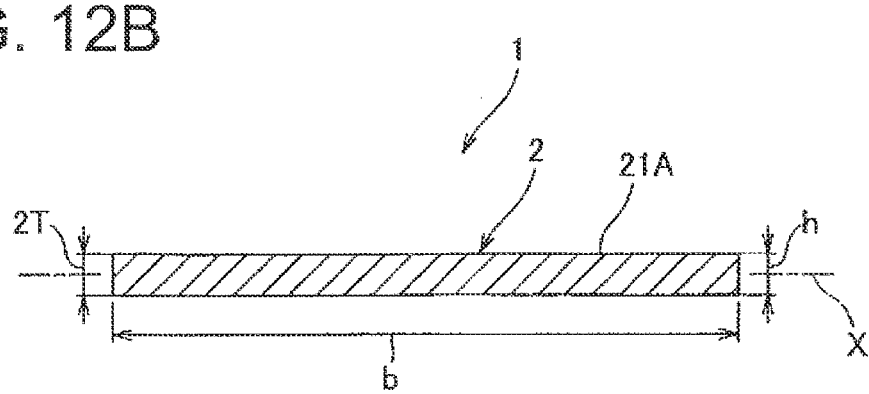
FIG. 12B is a cross-sectional view of a plate portion by one plate instead of a pair of plate portions shown in FIG. 12A.
Figure 13:
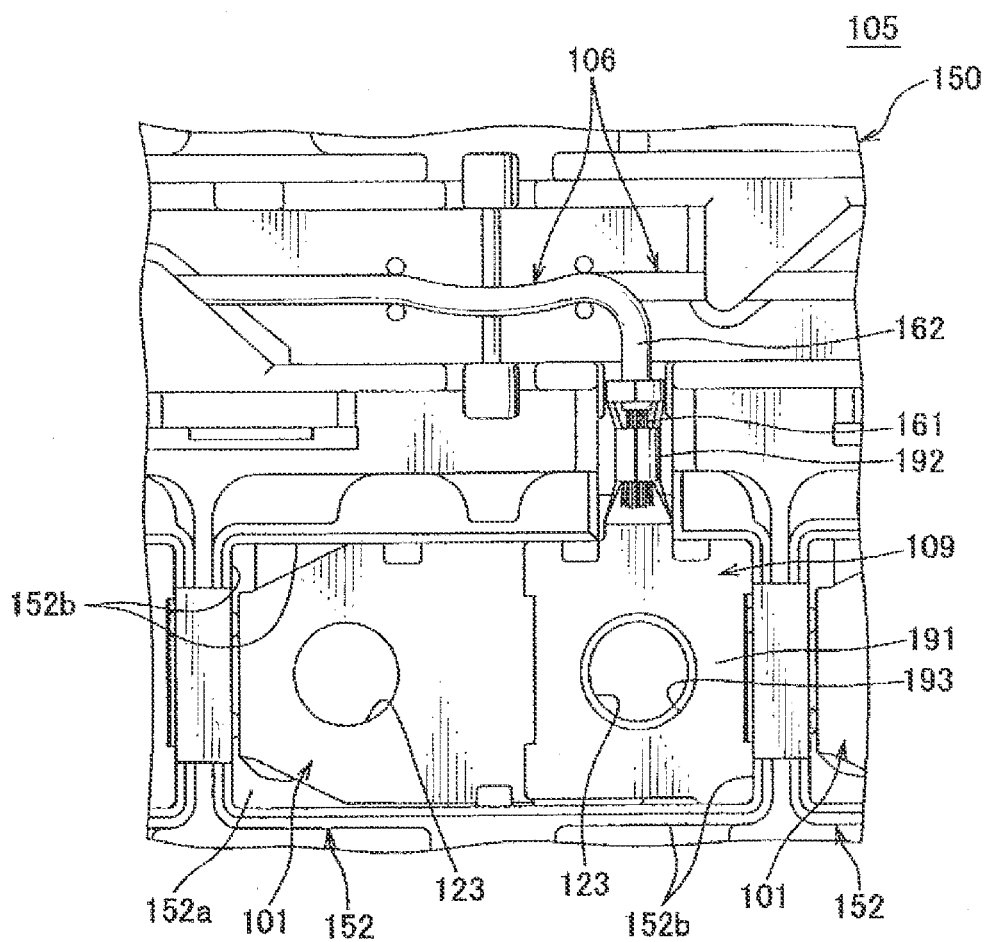
FIG. 13 is a plan view of an electric power supply prior art.

By leading from Formula 1 and FIG. 12B, the second moment of area I1 of the object by the single plate portion 21A is indicated by assigning thickness 2T to the height h;

$$I1 = b*(2T)3/12 = 8b*T3/12$$

Thus, the second moment of area I2 of the object by two overlapped plate portions 21 becomes ¼ value of the second moment of area I1 of the object by the single plate portion 21A. The plate portion by applying two overlapped plate portions 21 can be bent four times easier than the plate portion by single plate portion 21A having the same thickness.

In this embodiment, the electric wire 6 is connected directly to the busbar 1, so that a terminal, which is connected with the electric wire 6 and connected with the busbar 1, is not required. Therefore, number of components can be reduced. The terminal is not required, so that processes of the assembling is reduced and operation time of assembling can be reduced and working property of assembling can be improved.

The cross-sectional area S1 of the bridge portions 32 is smaller than the cross-sectional area S2 of the welding portion 31, so that when the electric wire 6 is welded to the busbar 1, heating by resistance generated at the welding portion 31 is not easily transmitted through the bridge portions 32 to the battery connecting portion 2. Thus, the welding portion 31 and the core wire 61 can be melted efficiently, so that the busbar 1 and the electric wire 6 can be welded securely.

The core wire 61 of the electric wire 6 is overlapped on the projection 31a projecting from the surface of the welding portion 31 and welded to the projection 31a, so that contact area of contact point of the welding portion 31 and the core wire 61 can be reduced. Thereby, the construction resistance is formed at the contact point so that heat by resistance can be easily generated and the generated heat is not easily flowed to the bridge portions 32. Therefore, the welding portion 31 and the conductive core 61 wire can be melted efficiently and the busbar 1 and the electric wire 6 can be securely welded to each other.

The pair of plate portions 21 overlapped to each other can be easily bent more than the single plate portion 21A having the same thickness as total thickness of the pair of plate portions 21. Therefore, when there is the dispersion D of the height of the electrodes 43, 44 of the battery 41, the dispersion of the height of the electrodes 43, 44 can be absorbed by bending the pair of plate portion 21. Therefore, the busbar 1 and the battery 41 can be connected securely. The busbar 1 can be formed by pressing thinner metal sheet, so that the busbar 1 can be manufactured by good yield, and production cost can be reduced. The wire connecting portion 3 has a complicated shape by having the bridge portion 32 and the protection 31a, so that the yield may be reduced. The busbar 1 can be formed by thinner metal sheet so that the busbar 1 can be manufactured by good yield.

In the above embodiment, the busbar 1 and the core wire of the electric wire 6 is connected directly by resistance welding. According to the present invention, the wire connecting portion 3 can have a bottom plate portion continued to the plate portion 21 and a plurality of clamp pieces continued to both ends of the bottom plate portion, and by placing the core wire 61 on the bottom plate portion and clamping the clamp pieces, the busbar 1 and the core wire 61 can be connected. The busbar 1 and the core wire 61 can be joined directly by welding other than resistance welding.

In the above embodiment, the electric wire 6 is examplaed as the circuit body. FPC (Flexible Printed circuit) an FFC (Flexible Flat Cable) can be also applied as the circuit body.

In the above embodiment, the busbar receiving section 52 and the wire guide section 53 are formed integratedly. The busbar receiving section 52 and the wire guide section 53 can be formed as separated components and previously, the busbar 1 is mounted in the busbar receiving section 52, and the electric wire 6 is set in the wire guide section 53, and after the wire guide section 53 is mounted at the busbar receiving section 52, and the core wire 61 is overlapped in the projection 31a, the busbar 1 and the electric wire 6 can be welded.

In the above embodiment, after busbar 1 is mounted in the busbar receiving section 52 and the electric wire 6 is led in the wire guide section 53, the busbar 1 and the electric wire 6 are welded. The busbar and the electric wire 6 which are previously welded, can be mounted at the plate 50. In the case, the busbar 1 and the electric wire 6 may be arranged and fixed at a tray shape jig for operating the resistance welding.

The present inventions are described based in the embodiments as mentioned above, but the present invention is not limited in above embodiments. Various change and modifications can be made with the scope of the present invention.

REFERENCE SIGNS LIST

Busbar
2 Battery connecting portion
3 Wire connecting portion (circuit body connecting portion)
6 Electric wire (circuit body)
21 Plate portion
22 Second bridge portion
23, 23a Hole
31 Welding portion
31a Projection
32 Bridge portion
41, 41a, 41b Battery
43, 43a Positive electrode
44, 44a Negative electrode
61 Core wire
C Direction perpendicular to a direction of connecting
S1 Cross-sectional area of bridge portion
S2 Cross-sectional area of welding portion

The invention claimed is:

1. A busbar, comprising:
a battery connecting portion connecting electrodes of two batteries to each other; and
a circuit body connecting portion continued to the battery connecting portion and connected directly to a circuit body by overlapping a conductive core wire of the circuit body on the circuit body connecting portion, wherein the circuit body connecting portion comprises:
a welding portion, at which the conductive core wire of the circuit body is welded; and
a bridge portion connecting the welding portion and the battery connecting portion,
wherein a cross-section area of the bridge portion along an intersecting direction intersecting a direction of connecting the welding portion and the battery connecting portion is configured to be smaller than a cross-section area of the welding portion along the intersecting direction,
wherein the welding portion comprises a projection, which projects from a surface of the welding portion, and the conductive core wire of the circuit body is overlapped on and welded on the projection.

2. The busbar according to claim 1, wherein the battery connecting portion comprises:
a plurality of plate portions overlapped to each other and having a hole passing the electrode of the battery; and
a second bridge portion joining the plate portions to each other.

* * * * *